(12) United States Patent
Lu et al.

(10) Patent No.: US 9,619,246 B2
(45) Date of Patent: *Apr. 11, 2017

(54) ELECTRONIC COMPUTING DEVICE AND REBOOT METHOD THEREOF

(71) Applicant: HON HAI PRECISION INDUSTRY CO., LTD., New Taipei (TW)

(72) Inventors: Chi-Chang Lu, New Taipei (TW); Deng-Rung Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 197 days.

This patent is subject to a terminal disclaimer.

(21) Appl. No.: 14/558,728

(22) Filed: Dec. 3, 2014

(65) Prior Publication Data

US 2015/0089105 A1  Mar. 26, 2015

Related U.S. Application Data

(60) Continuation-in-part of application No. 13/853,221, filed on Mar. 29, 2013, now Pat. No. 8,935,522, which is a division of application No. 12/768,738, filed on Apr. 28, 2010, now Pat. No. 8,443,182.

(30) Foreign Application Priority Data

Mar. 30, 2010 (CN) .......................... 2010 1 0136237

(51) Int. Cl.
*G06F 9/24* (2006.01)
*G06F 9/44* (2006.01)
*G06F 13/24* (2006.01)
*G06F 9/50* (2006.01)

(52) U.S. Cl.
CPC .............. *G06F 9/442* (2013.01); *G06F 13/24* (2013.01); *G06F 9/5022* (2013.01); *Y02B 60/1228* (2013.01); *Y02B 60/142* (2013.01)

(58) Field of Classification Search
CPC ................................. G06F 9/442; G06F 13/24
USPC ........................................................ 713/1, 2
See application file for complete search history.

(56) References Cited

U.S. PATENT DOCUMENTS

| | | | |
|---|---|---|---|
| 6,594,723 B1 * | 7/2003 | Chapman | G06F 8/65 711/103 |
| 6,965,989 B1 * | 11/2005 | Strange | G06F 1/24 709/220 |
| 8,443,182 B2 * | 5/2013 | Lu | G06F 9/445 713/1 |
| 8,935,522 B2 * | 1/2015 | Lu | G06F 9/442 713/1 |
| 2005/0216721 A1 * | 9/2005 | Zimmer | G06F 9/4401 713/2 |

(Continued)

*Primary Examiner* — Vincent Tran
(74) *Attorney, Agent, or Firm* — Zhigang Ma

(57) ABSTRACT

An electronic computing device comprises first and second nonvolatile memories. The second nonvolatile memory serves as a main memory of the device. A processor clears the second nonvolatile memory in response to shutdown command according to a setting reflecting a first user operation. A processor clears the second nonvolatile memory and loads the kernel from the first nonvolatile memory to the second nonvolatile memory in response to a boot command according to a condition of a second user operation detected by the processor regardless of the setting reflecting the first user operation.

20 Claims, 9 Drawing Sheets

(56) References Cited

U.S. PATENT DOCUMENTS

2006/0142906 A1* 6/2006 Brozovich ............ G06F 9/4401
                                                    701/33.4
2008/0235505 A1* 9/2008 Hobson .................. G06F 9/442
                                                    713/100

* cited by examiner

ELECTRONIC COMPUTING DEVICE AND REBOOT METHOD THEREOF

CROSS-REFERENCE TO RELATED APPLICATIONS

This application is a continuation in part of U.S. application Ser. No. 13/853,221, entitled "ELECTRONIC COMPUTING DEVICE AND REBOOT METHOD EXECUTABLE BY SAME", filed on Mar. 29, 2013, published as US20130227265A1, which is a divisional of U.S. application Ser. No. 12/768,738, entitled "MEDIA DATA PLAYBACK DEVICE AND REBOOT METHOD THEREOF", filed on Apr. 28, 2010, published as US20110246758A1, which is based upon and claims the benefit of priority from Chinese Patent Application No. 201010136237.4, filed Mar. 30, 2010 in the People's Republic of China. The entirety of each of the above-mentioned patent applications is hereby incorporated by reference herein.

BACKGROUND

1. Technical Field

The disclosure relates to computer technologies, and more particularly to a media data playback system and reboot method thereof.

2. Description of Related Art

TV converters, known as set-top boxes, manage the higher channel numbers not supported by TVs, descramble, decrypt, and decode channel signals into rich video content and other information, such as program guides. During the bootstrapping of a set-top box, a boot loader is executed to clear a main memory, decompress and load and the OS from a flash memory to the main memory for execution. Since memory clearing and OS loading is a portion of the bootstrapping, reboot is also an option to solve system failure, for example, when a virtual memory area is erroneously overwritten. Decompressing and loading an OS, however, may be time consuming and delays video display.

DETAILED DESCRIPTION

Description of exemplary embodiments of media data playback device and reboot method thereof is given in the following paragraphs which are organized as:

1. System Overview
   1.1 Exemplary Media Data Playback Device
   1.2 Exemplary Embodiments of Main Memory
2. Exemplary operations of the media data playback device
   2.1 Operations Before Device Shutdown
   2.2 Operations During Device Bootstrapping
3 Variations
4. Conclusion

1. System Overview

The disclosed media data playback device can be implemented as a stand-alone device or integrated in various media data playback devices, such as a set top box, a cell phone, a tablet personal computer (PC), a laptop computer, a monitor, a multimedia player, a digital camera, a personal digital assistant (PDA), a navigation device or a mobile internet device (MID).

1.1 Exemplary Media Data Playback Device

Figure 1:
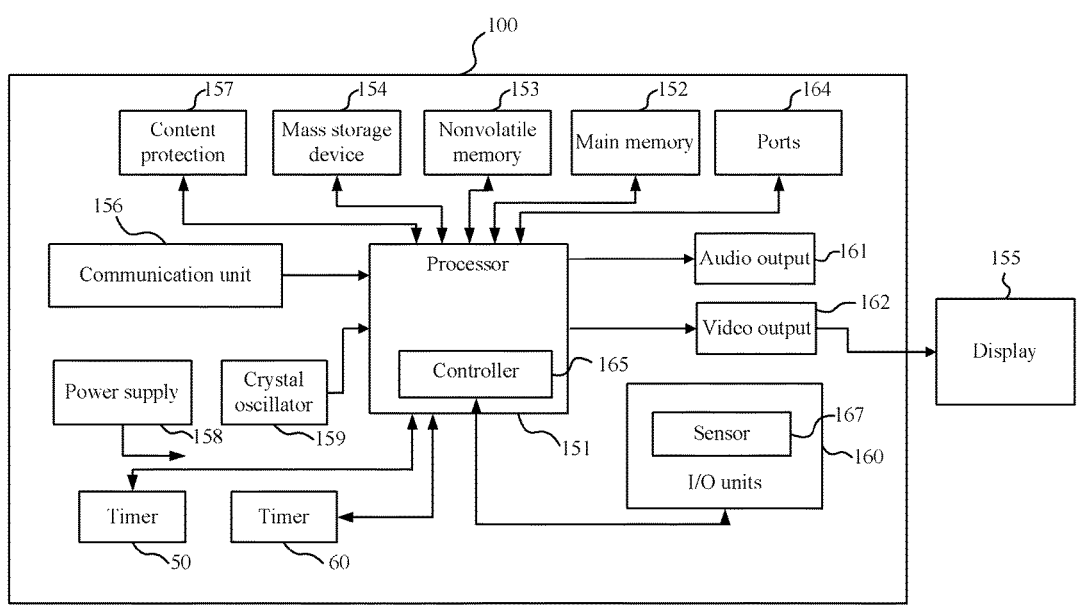
FIG. 1 is a block diagram of an exemplary embodiment of a media data playback device.

With reference to FIG. 1, a processor 151 comprises a central processing unit of the media data playback device 100. The processor 151 may comprise various integrated circuits (ICs) for processing data and machine-readable instructions. Connection of the components in the device 100 is shown in FIG. 1 and may comprise serial or parallel transmission buses, or wireless communication channels. A communication unit 156 establishes wireless communication channels through which the media data playback device 100 may connect to and download media data streams from a remote station, such as one of the famous video sharing website or video service website on the Internet. Additionally, the communication unit 156 may establishes wireless communication channels through which a portable device, such as a remote control, a mobile phone, or a palm top computer, may connect to and exchange data with the media data playback device 100. The communication unit 156 may comprise of antennas, baseband and radio frequency (RF) chipsets for wireless local area network (LAN) communication and/or cellular communication such as wideband code division multiple access (W-CDMA), high speed downlink packet access (HSDPA), long term evolution (LTE), LTE-Advance, and other beyond 4G communication technologies. Through the established wireless communication channels, the device 100 may serve as a wireless LAN access point or hotspot through which the portable device connects to the Internet. The wireless LAN access point (AP) or hotspot comprises an interface operable to convert signals and data packets transferred between the wireless communication channel connected to the Internet and the wireless communication channel connected to the portable device. Exemplary wireless LAN hotspot can be referred to U.S. Pat. Nos. 7,319,715 and 8,208,517.

The communication unit 156 may comprise a first set of communication circuitry operable to function as a wireless LAN mobile terminal and a second set of communication circuitry operable to function as a wireless LAN mobile access point (AP). Each of the first and second sets of communication circuitry antennas, baseband and radio frequency (RF) chipsets for wireless LAN communication. The device 100 may utilize a wireless communication channel of wireless LAN or cellular communication established by the communication unit 156 as backhaul connecting to a core network and the Internet. The device 100 may utilize the second set of communication circuitry to transmit wireless LAN beacons and establish a wireless communication channel of wireless LAN for radio access by other mobile devices.

The processor 151 may be packaged as a chip or comprise a plurality of chips interconnected through buses. For example, the processor 151 may only comprise of a central processing unit (CPU) or a combination of a CPU, a digital signal processor (DSP), and a chip of a communication controller, such as a chip of the communication unit 156. The communication controller may comprise one or more controllers of wired or wireless communication, such as a cellular communication, infrared, Bluetooth™, or wireless local area network (LAN) communication. The communication controller coordinates communication among components of the media data playback device 100 or communication between the media data playback device 100 and external devices.

A power supply 158 provides electrical power to components of the media data playback device 100. A crystal oscillator 159 provides clock signals to the processor 151 and other components of the media data playback device 100. The timers 50 and 60 keep track of predetermined time intervals and may comprise of circuits, machine-readable programs, or a combination thereof. Each of the timers 50 and 60 generates signals to notify expiration of the predetermined time intervals. Input and output (I/O) units 160 may comprise control buttons, an alphanumeric keypad, a touch panel, a touch screen, and a plurality of light emitting diodes (LEDs). A controller 165 detects operations on the I/O units 160 and transmits signals indicative of the detected operations to the processor 151. The controller 165 also controls operations of the I/O units 160. The processor 151 may control the I/O units 160 through the controller 165. Ports 164 may be used to connect to various computerized interfaces, such as an external computer, or a peripheral device. The ports 164 may comprise physical ports complying with universal serial bus (USB) and IEEE 1394 standards, recommended standard 232 (RS-232) and/or recommended standard 11 (RS-11) defined by Electronics Industries Association (EIA), serial ATA (STATA), and/or high-definition multimedia interface (HDMI).

A content protection system 157 provides access control to digital content reproduced by the device 100. The content protection system 157 may comprise memory and necessary devices for implementing digital video broadcasting—common interface (DVB-CI) and/or conditional access (CA). The device 100 may obtain digital content from broadcast signals through an antenna, a tuner, and a demodulator. Alternatively, the device 100 may obtain digital content from an information network, such as the Internet, through a network interface.

A video output unit 162 comprises filters and amplifiers for filtering and amplifying video signals output by the processor 151. An audio output unit 161 comprises a digital to analog converter converting audio signals output by the processor 151 from digital format to analog format.

A display 155 is operable to display text and images, and may comprise e-paper, a display made up of organic light emitting diode (OLED), a field emission display (FED), or a liquid crystal display (LCD). Alternatively, the display 155 may comprise a reflective display, such as an electrophoretic display, an electrofluidic display, or a display using interferometric modulation. The display 155 may display various graphical user interfaces (GUIs) as virtual controls including but not limited to windows, scroll bars, icons, and clipboards. The display 155 may comprise a single display or a plurality of displays in different sizes.

The I/O units 160 comprise a touch sensor 167 operable to detect touch operations on the display 155. The touch sensor 167 may comprise a transparent touch pad overlaid on the display 155 or arrays of optical touch transmitters and receivers located on the boarder of the display 155, such as those disclosed in US patent publication No. 20090189878.

1.2 Exemplary Embodiments of Main Memory

Nonvolatile memory 153 stores an operating system (OS) and application programs executable by the processor 151. The processor 151 may load runtime processes and data from the nonvolatile memory 153 to the main memory 152 and store digital content in a mass storage device 154. The media data playback device 100 may obtain digital content such as multimedia data through the communication unit 156. The main memory 152 may comprise a nonvolatile random access memory (NVRAM), such as phase-change random access memory (PRAM), magnetoresistive random access memory (MRAM), or other NVRAM. Some examples of NVRAM comprise ferroelectric RAM, resistive RAM, organic bistable memory material, such as those disclosed in U.S. Pat. No. 7,405,167, US patent publication No. 20090146140, or 20090221113. One example of MRAM is spin-transfer torque magnetic random access memory (STT-MRAM). The nonvolatile memory 153 may comprise an electrically erasable programmable read-only memory (EEPROM) or a flash memory, such as a NOR flash or a NAND flash, or an NVRAM. In the following, a PRAM is described as an example of the main memory 152, and a flash memory is described as an example of the nonvolatile memory 153. The example of a PRAM and a flash memory is not intended to limit the disclosed reboot methods and devices. The main memory 152 and the nonvolatile memory 153 may be two logically defined memory areas of an NVRAM unit where the memory area defined as the nonvolatile memory 153 is operable to store the OS intact while the memory area defined as the main memory 152 is operable to be random accessed as the main memory of the processor 151. The NVRAM may electrically connected to the processor 151 through a bus or integrated into the processor 151 as one chip, such as a system on a chip (SOC) or a system in a package (SiP).

A PRAM is a non-volatile memory storing data using chalcogenide materials, such as Germanium-Antimony-Tellurium alloy (Ge—Sb—Te or GST). The crystalline and amorphous states of the phase-change material GST have different electrical resistivity. Phase change between the crystalline and amorphous states may be obtained by temperature control. Under 150° C., both phases are stable. Over 200° C., nucleation of crystallites is fast and if the material is kept to the crystallization temperature for a sufficient time, it changes phase and becomes crystalline. In order to change the phase back to the amorphous state, the chalcogenide temperature is brought over the melting point (about 600° C.) and rapidly reduced.

Figure 3:
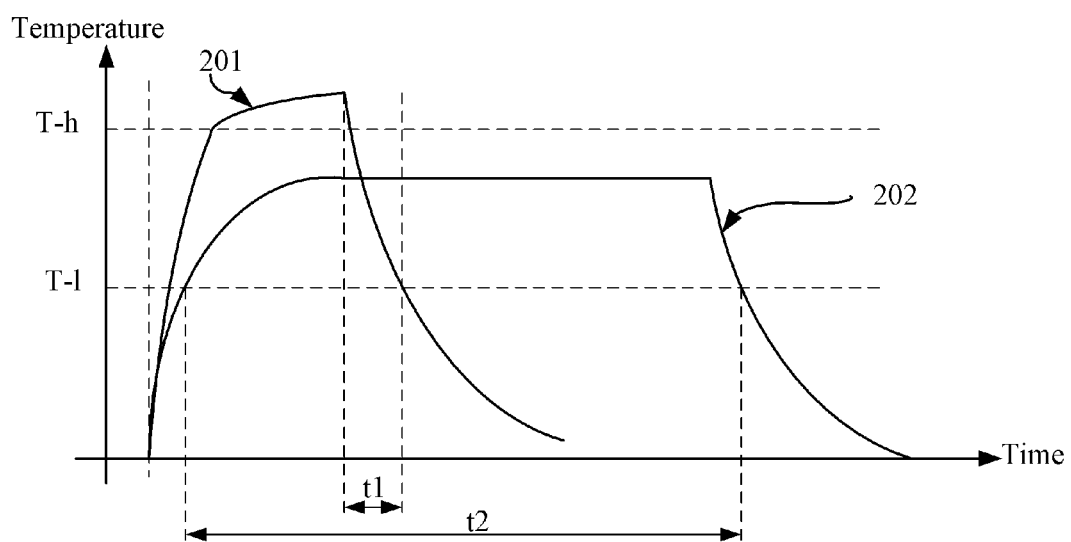
FIG. 3 is a schematic diagram showing a set and reset pulses of an exemplary embodiment of a phase change memory element.

FIG. 3 shows the plots of the required temperature versus time to activate phase changes of the phase-change material GST. T-h indicates the melting temperature of the phase-change material GST, and T-l indicates the temperature at which crystallization of the phase-change material GST begins. A curve 201 referred to as a reset pulse shows temperature control for a phase change from the crystalline to the amorphous state, and curve 202 referred to as a set pulse shows temperature control for a phase change from the amorphous to the crystalline state. As shown, amorphization requires a short time but a high temperature heating followed by cooling in a very short time t1. Crystallization requires a long time heating (denoted by duration t2) to allow nucleation and crystal growing.

Figure 4:
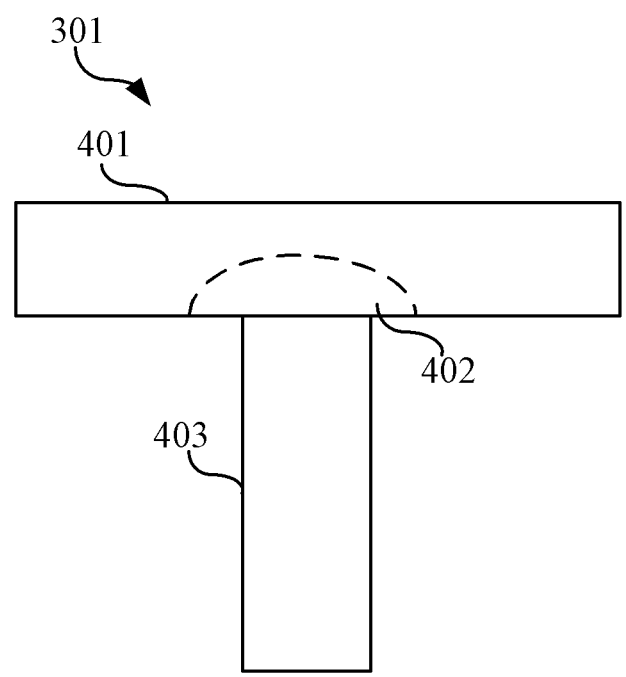
FIG. 4 is a schematic diagram of an exemplary embodiment of a cell of a phase change random access memory (PRAM).

FIG. 4 shows a memory device 301 made from the chalcogenide material. A heater 403 comprising a resistive electrode 403 in contact with or close to the chalcogenide material 401 may conduct current and be heated according to Joule effect to carry out the temperature control of set and reset pulses. The chalcogenide material 401 is generally in the crystalline state to allow good current flow. A portion 402 of the chalcogenide material 401 is in direct contact with the heater 403 and forms a phase change portion 402.

The state of the chalcogenide region 402 may be read by applying a sufficiently small voltage so as not to cause a sensible heating and measuring the current passing through it. Since the current is proportional to the conductance of the chalcogenide material, it is possible to discriminate between the two states.

Figure 5:
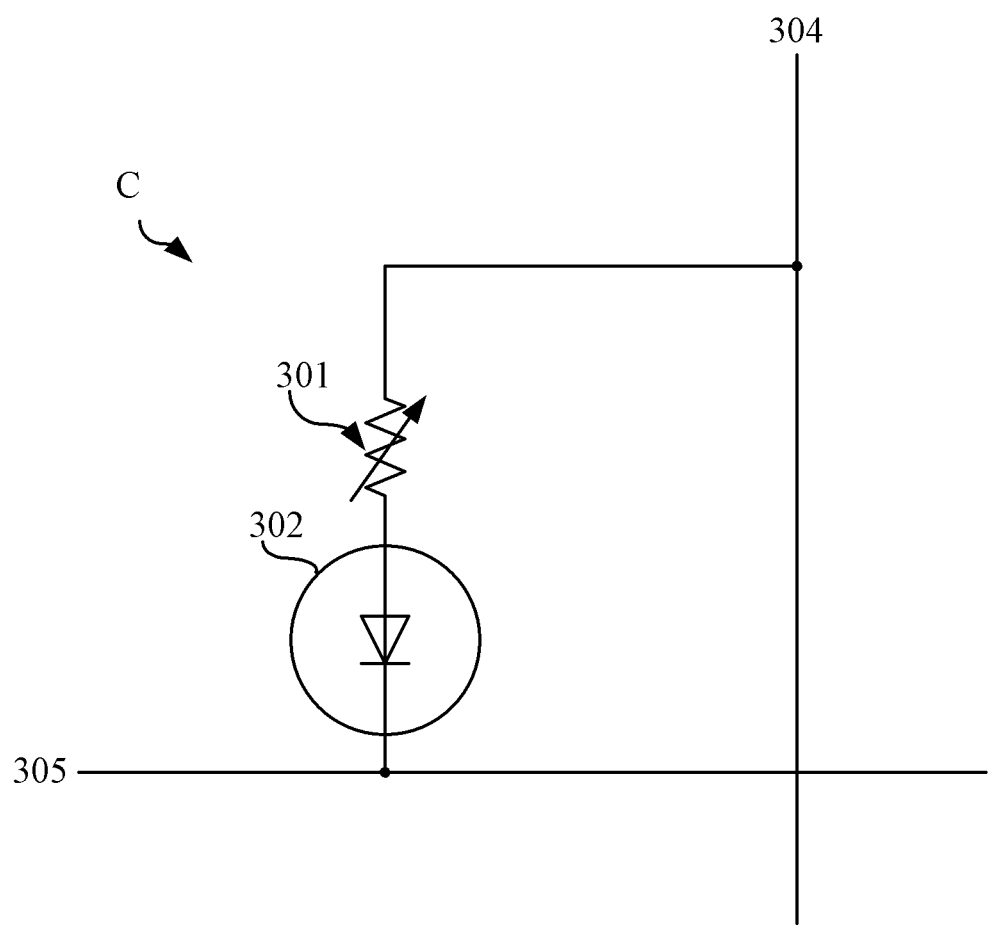
FIG. 5 is a cross section of an exemplary embodiment of a memory a cell of a PRAM.

FIG. 5 is an equivalent circuit diagram showing a unit cell C of a PRAM. The unit cell C of the PRAM includes the memory device 301 and a diode 302. The diode 302 is a selection element and may be replaced by a transistor. The memory device 301 comprises phase-change material and is connected to a bit line 304 and a P-junction of the diode 302. A word line 305 is connected to an N-junction of the diode 302.

The memory device 301 can be considered as a resistor, which conducts a different current according to its phase. When appropriately biased, the memory device 301 is defined as "set" or "logic 1" in condition of conducting a detectable current, and as "reset", or "logic 0" in condition of not conducting current or conducting a much lower current than a cell that is set.

The main memory 152 comprising an array of PRAM cells to provide random access to data stored in the main memory 152.

2. Exemplary Operations of the Media Data Playback Device

Figure 2:
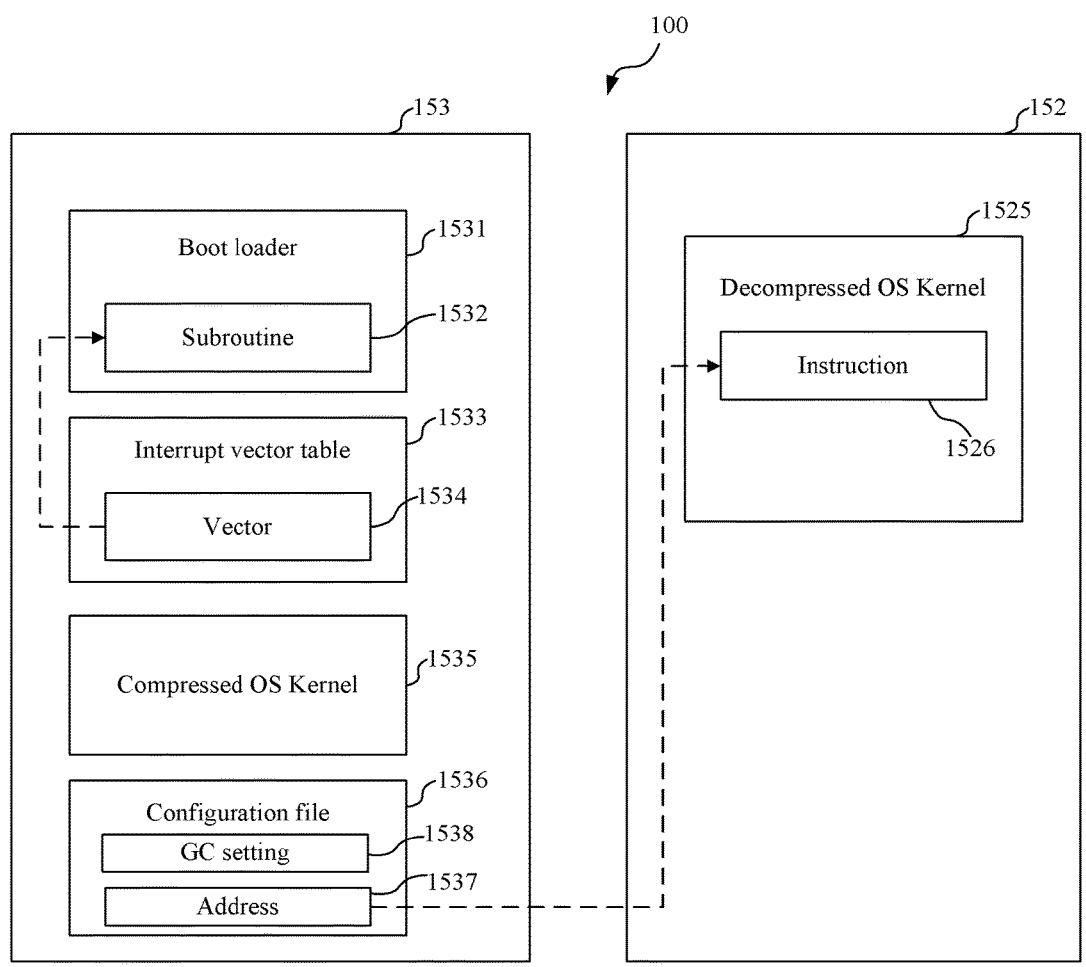
FIG. 2 is a block diagram of an exemplary embodiment of memory modules of the media data playback device.

With reference to FIG. 2, the nonvolatile memory 153 stores a boot loader 1531, a configuration file 1536 thereof, an operating system kernel 1535 in a compressed format, and an interrupt vector table 1533. Note that in alternative embodiments, the nonvolatile memory 153 may store the operating system kernel 1535 in an uncompressed format. A subroutine 1532 in the boot loader 1531 is registered as an interrupt service routine for an interrupt representative of a shutdown or power-off command and is targeted by a vector 1534 in the interrupt vector table 1533. A reboot command may comprise a shutdown command and a subsequent bootstrapping command. The configuration file 1536 further comprises a garbage collection (GC) setting 1538 specifying options of garbage collection processes. The GC setting 1538 may be user adjustable or automatically configured by the processor 151 according to system usage, such as use time from last bootstrapping of the device 100.

When the I/O units 160 receives a depression of a power key of the media data playback device 100 a representative of a boot or power-on command, the processor 151 executes the boot loader 1531 to perform bootstrapping and initialization and to trigger migration of the kernel 1535 in response to the boot command. Wherein, the migration of the kernel 1535 comprises loading and decompressing thereof from the nonvolatile memory 153 to the main memory 152, to generate kernel 1525 in the main memory 152. The processor 151 executes operations of the OS. The migration of the kernel 1535 in response to the boot command is referred to as a first migration of the kernel 1535. A subroutine in the boot loader 1531 executing the migration of the kernel 1535 may be registered as an interrupt service routine for an interrupt representative of a bootstrapping or power-on command. The bootstrapping comprises clearing of the main memory 152. Note that in alternative embodiments, the nonvolatile memory 153 may store the operating system kernel 1535 in an uncompressed format, so that decompressing of the kernel 1535 is not executed in the migration of the kernel 1535.

2.1 Operations before Device Shutdown

Figure 6:
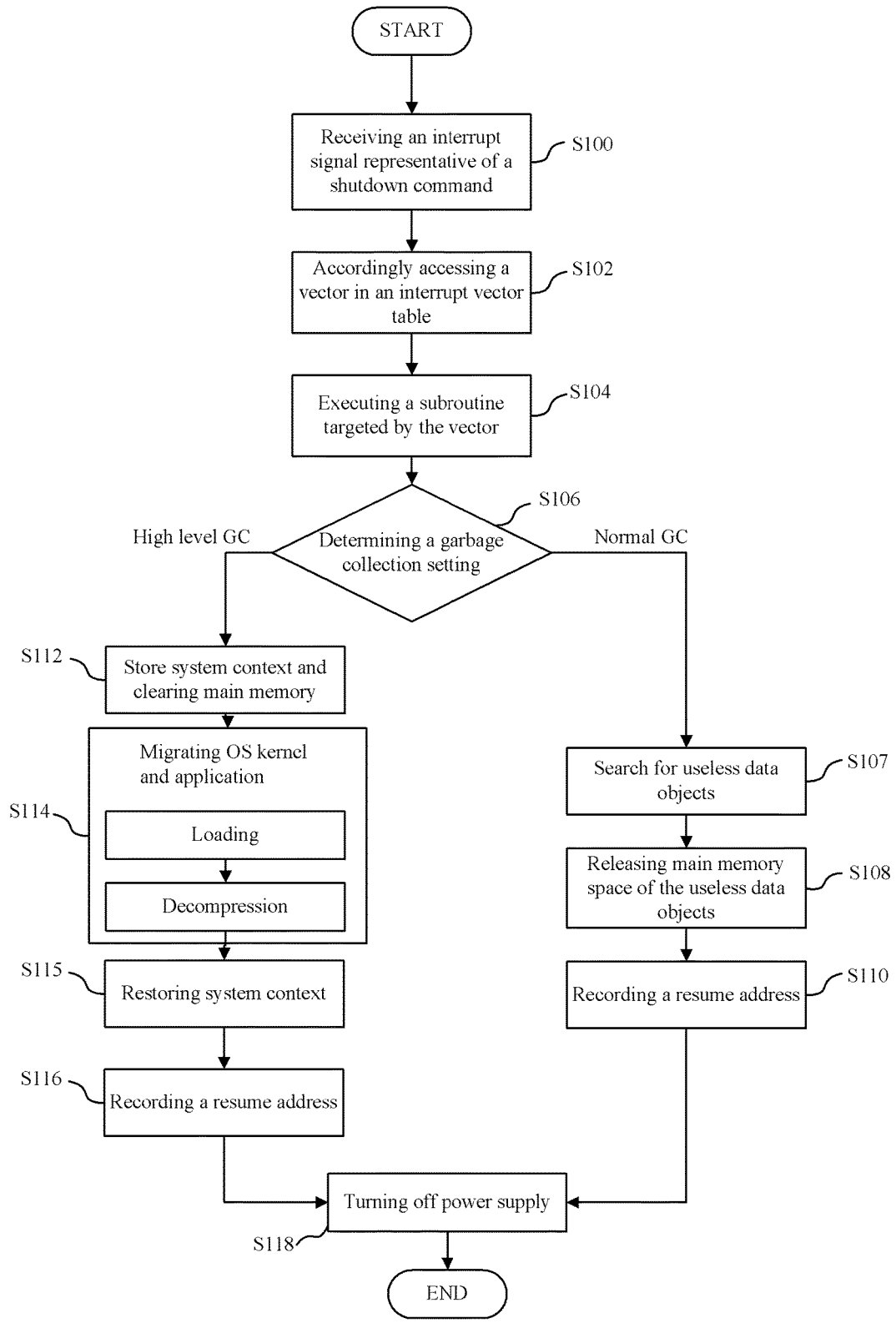
FIG. 6 is a flowchart showing exemplary operations of the media data playback device in response to a shutdown command.

With reference to FIG. 6, during operation of the media data playback device 100, the I/O units 160 receives depression of a power key of the media data playback device 100, and issues an interrupt signal representative of a shutdown command to the processor 151 (step S100). The processor 151 performs the following operations in response to the shutdown command. The processor 151 accesses a vector 1534 in the interrupt vector table 1533 corresponding to the interrupt signal (step S102), retrieves and executes a subroutine 1532 targeted by the vector 1534 (step S104). Under direction of the subroutine 1532, the processor 151 may display a shutdown message or disable video signal output, and performs one of a plurality of levels of garbage collection (GC) detailed in the following according to a GC setting. The GC setting is a memory releasing setting indicating one of a plurality of memory processes.

The processor 151 determines a GC setting 1538 in a configuration file 1536 (step S106). In response to a GC setting indicative of normal garbage collection, the processor 151 searches the main memory 152 for data objects that cannot be accessed by other programs in the device 100 (step S107) and releases space of the main memory 152 occupied by these objects (step S108). The processor 151 records an address 1537 of the main memory 152 from which execution of the kernel 1535 is designated to resume (step S110) and triggers the device 100 to power off (step S118). An old version of kernel 1525 is retained in the main memory 152 through the steps S107, S108, S110, and S118. The steps S107 and S108 form one of the plurality of memory processes.

In response to a GC setting indicative of high level garbage collection, the processor 151 stores system context to the nonvolatile memory 153, clears the main memory 152 (step S112), triggers a further migration of the kernel 1535 and application programs from the nonvolatile memory 153 to the main memory 152 according to the stored system context (step S114), and restores system context (step S115). The clearing of the main memory 152 comprises deleting all data in the main memory 152. A new version of kernel 1525 is retained in the main memory 152 through the steps S112, S114, S115, and S118. The migration of the kernel 1535 in response to the shutdown command is referred to as a second migration and comprises loading and decompressing of the compressed kernel 1535 from the nonvolatile memory 153 to the main memory 152. Similarly, the migration of the application programs comprises loading and decompressing thereof from the nonvolatile memory 153 to the main memory 152. The system context comprises hardware component configurations, page tables, process management data, process data structure of the application programs, and other system settings. In step S115, the processor 151 may restore a portion of the system context, for example, a portion thereof to the main memory 152. The remaining portions of the system context may be restored during subsequent bootstrapping of the device 100. Data and program distribution in the main memory 152 is rearranged through the step S114. In alternative embodiments of the device 100, a new version of kernel 1525 may be retained in the main memory 152 through shutdown of the device 100 by reloading triggers a migration of the kernel 1535 without restoring the system context. The step S112 forms another one of the plurality of memory processes. The processor 151 records an address 1537 of the main memory 152 from which execution of the kernel 1535 is designated to resume in response to reboot of the media data playback device 100 (step S116) and triggers the device 100 to power off (step S118). For example, the processor 151 turns off the power supply 158.

The clearing of the main memory 152 and the migration of the kernel 1535 is a portion of normal bootstrapping of the device 100. Through the execution of steps S112 and S114, the processor 151 performs a portion of the bootstrapping of the device 100 in response to the shutdown command before actually shutting down the device 100. The processor 151 may rearrange utilization of the main memory 152 after the migration of the kernel 1535 and other application programs before actually shutting down the device 100. Alternatively, in step S114, the processor 151 may only trigger migration of the kernel 1535. The processor 151 may disable other interrupt handling for any subsequent interrupt during execution of the steps S107, S108, S110, S112, S114, S115, and S116 and render these steps non-interruptible.

2.2 Operations during Device Bootstrapping

Figure 7:
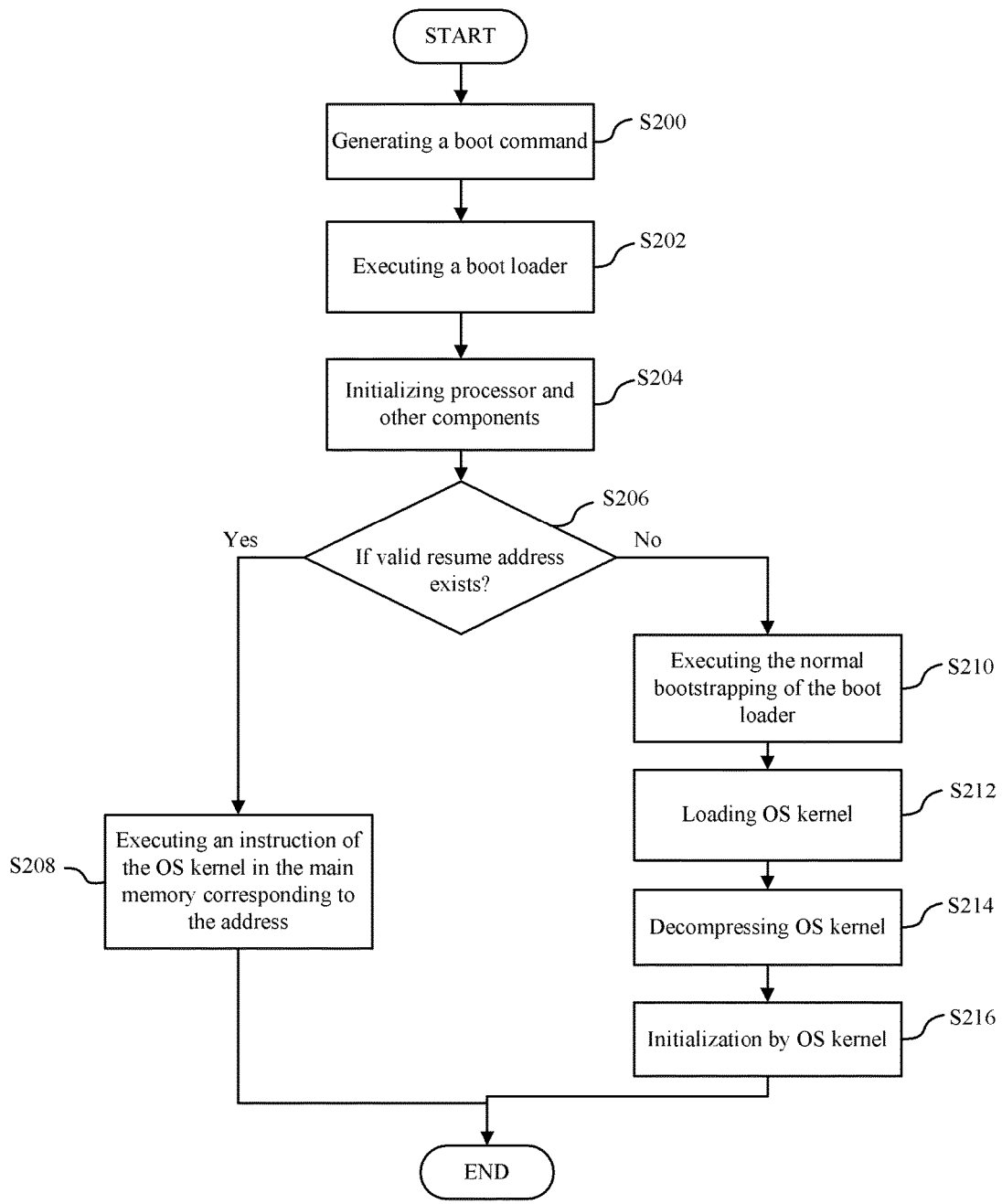
FIG. 7 is a flowchart showing exemplary operations of the media data playback device in response to a boot command.

With reference to FIG. 7, during power off state of the media data playback device 100, depression of the power key of the media data playback device 100 triggers a boot command to the processor 151 (step S200). The processor 151 performs the following operations in response to the boot command.

When receiving the boot command from the input unit, the processor 151 executes the boot loader 1531 (step S202). The processor 151 may perform one of the plurality of memory leasing processes based on a bootstrap-related field. For example, the bootstrap-related field may comprise the configuration file 1536 which comprises the resume address 1537. The boot loader 1531 directs initialization of the processor 151 and other components of the device 100 (step S204), and directs the processor 151 to determine if a valid resume address exists (step S206). When determining that the valid resume address 1537 exists, the processor 151 retrieves the stored resume address 1537 and executes an instruction 1526 of the kernel 1525 in the main memory 152 corresponding to the address 1537 (step S208). A dotted arrow in FIG. 2 shows relationship between the address 1537 and the instruction 1526. Thus, the processor 151 switches execution to the address 1537 of the main memory 152. Clearing of the main memory 152 and the migration of the kernel 1535 and application programs after the boot command is not performed, thus reducing time required for rebooting the device 100.

When determining that the valid resume address 1537 does not exist, the processor 151 executes the normal bootstrapping by executing the boot loader 1531 (step S210), loads and decompresses the OS kernel 1535 to generate the OS kernel 1525 (steps S212 and S214), and performs other system initialization under direction of the OS kernel 1525 (step S216). The bootstrapping in step S201 comprises clearing of the main memory 152.

3 Variations

In some embodiments of the reboot method, the processor 151 may not perform memory releasing during the shutdown process. The processor 151 may perform one of the plurality of memory leasing processes during bootstrapping based on an instance of the bootstrap-related field. The instance of the bootstrap-related field may be user-adjustable or automatically configured by the processor 151 according to system usage, such as use time from last bootstrapping of the device 100.

Figure 8:
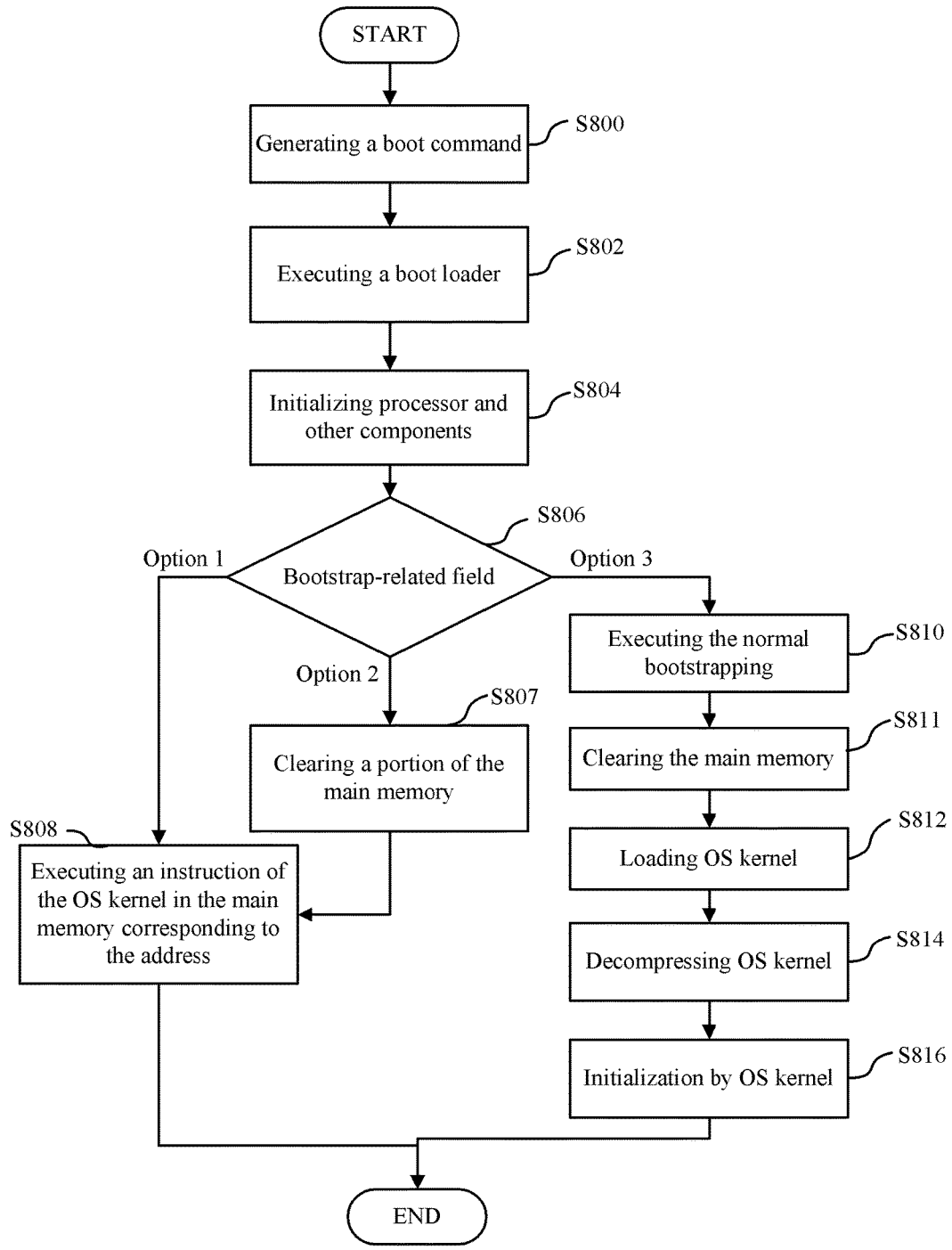
FIG. 8 is a flowchart showing alternative exemplary operations of the media data playback device in response to a boot command.

With reference to FIG. 8, during power off state of the media data playback device 100, depression of the power key of the media data playback device 100 triggers a boot command to the processor 151 (step S800). The processor 151 performs the following operations in response to the boot command.

When receiving the boot command from the input unit, the processor 151 executes the boot loader 1531 (step S802). The boot loader 1531 directs initialization of the processor 151 and other components of the device 100 (step S804), and directs the processor 151 to determine the instance of the bootstrap-related field (step S806). When determining that the instance of the bootstrap-related field represents a first option of a plurality of bootstrapping sequences, the processor 151 retrieves the stored resume address 1537 and executes an instruction 1526 of the kernel 1525 in the main memory 152 corresponding to the address 1537 (step S808). A dotted arrow in FIG. 2 shows relationship between the address 1537 and the instruction 1526. Thus, the processor 151 switches execution to the address 1537 of the main memory 152. Clearing of the main memory 152 and the migration of the kernel 1535 and application programs after the boot command is not performed, thus reducing time required for rebooting the device 100.

When determining that the instance of the bootstrap-related field represents a second option of the plurality of bootstrapping sequences, the processor 151 clears a portion of the main memory 152 (step S807), retrieves the stored resume address 1537 and executes an instruction 1526 of the kernel 1525 in the main memory 152 corresponding to the address 1537 (step S808), and switches execution to the address 1537 of the main memory 152. The second option of the plurality of bootstrapping sequences executes a partial memory releasing process through step S807. In some embodiments of the reboot method, the boot loader 1531 may direct the memory releasing processes. In some alternative embodiments of the reboot method, step S811 may be placed after step S808, so that the kernel 1525 may direct the memory releasing processes.

When determining that the instance of the bootstrap-related field represents a third option of the plurality of bootstrapping sequences, the processor 151 executes the normal bootstrapping by executing the boot loader 1531 (step S810), clearing the main memory 152 (step S811), loading and decompressing the OS kernel 1535 to generate the OS kernel 1525 (steps S812 and S814), and performs other system initialization under direction of the OS kernel 1525 (step S816). The third option of the plurality of bootstrapping sequences executes a complete memory releasing process by clear entire main memory 152 in step S811.

Table 1 shows embodiments A to I of the device 100 executing a reboot method. Each embodiment of the device 100 executes an embodiment of the reboot comprising a shutdown process and a bootstrapping process subsequent to the shutdown process. The embodiments of the device 100 may be implemented in different devices or in one device that provides options of executing reboot methods in some or all of the embodiments A to I. Each embodiment of the device 100 may utilize a semaphore to avoid a memory releasing process or an OS reloading process in the shutdown process being faultily repeated in a subsequent bootstrapping process or being erroneously missed. An example of the semaphore may be the bootstrap-related field. In the embodiments F, G, H, and I, the normal bootstrapping may be executed in response to a user operation, or an event of system statistics. The normal bootstrapping comprises clearing the main memory 152 and a migration of the OS kernel 1535. The processor 151 may detect the user operation and determine whether to enforce the clearing the main memory 152 and the migration of the OS kernel 1535 regardless of the content and status of the main memory 152. The user operation may be a key press, a key combination, or a selection of a GUI element. The user operation may take place and be detected during bootstrapping or before bootstrapping. A setting reflecting the user operation can be stored in a memory of the device 100. When receiving the user operation, the processor 151 enforces the clearing the main memory 152 and the migration of the OS kernel 1535 regardless of the content and status of the main memory 152.

TABLE 1

| | Shutdown process | Bootstrapping process |
| --- | --- | --- |
| Embodiment A | Retaining OS and resume address | Bypassing NVRAM clearing and OS reloading Resuming OS |
| Embodiment B | Retaining OS and resume address | Partially releasing NVRAM Resuming OS |
| Embodiment C | Partially releasing NVRAM Retaining OS and resume address | Bypassing NVRAM clearing and OS reloading Resuming OS |
| Embodiment D | Clearing NVRAM Reloading OS Retaining OS and resume address | Bypassing NVRAM clearing and OS reloading Resuming OS |
| Embodiment E | Clearing NVRAM | Bypassing NVRAM clearing Reloading OS |
| Embodiment F | Retaining OS and resume address | Normal bootstrapping |
| Embodiment G | Partially releasing NVRAM Retaining OS and resume address | Normal bootstrapping |
| Embodiment H | Clearing NVRAM | Normal bootstrapping |
| Embodiment I | Clearing NVRAM Reloading OS Retaining OS and resume address | Normal bootstrapping |

In the embodiments shown in table 1, retaining OS and resume address may be retaining a new version or an old version of the kernel 1525 in the main memory 152 and storing a resume address of the retained version of the kernel 1525 in a storage device or a non-volatile memory. Additionally, resuming OS comprises resuming execution of the OS kernel 1525 utilizing the resume address.

NVRAM may be a key enabler to the rise of machine to machine (M2M) communication, and Internet of things (IoT) because the number of M2M devices is expected to reach three billions in 2024 and power efficiency is critical to M2M devices. Machine to machine (M2M) communication sometimes are named as machine type communication (MTC) and may comprise device to device (D2D) communication, vehicle to vehicle (V2V) communication. Vehicle-to-vehicle communication (V2V communication) is the wireless transmission of data between motor vehicles. The goal of V2V communication is to prevent accidents by allowing vehicles in transit to send position and speed data to one another over an ad hoc mesh network.

Figure 9:
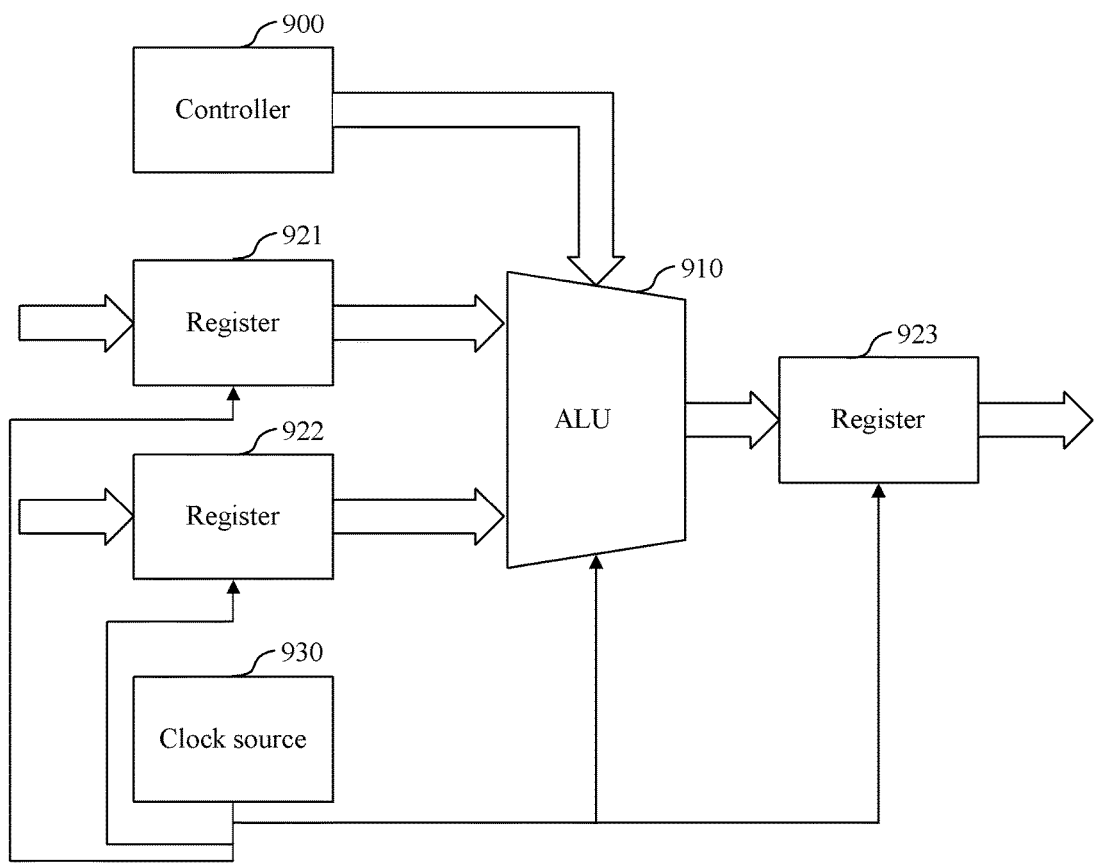
FIG. 9 is a schematic diagram of an exemplary embodiment of arithmetic logic units (ALU) of a processor.

With reference to FIG. 9, the processor 151 may be formed from one or more arithmetic logic units (ALUs) 910 utilizing NVRAM as register memory and cache memory. Registers 921, 922, and 923 are made from NVRAM. A clock source 930 provides clock signals to the ALU 910, and the registers 921, 922, and 923. Registers 921 and 922 respectively store and provide different operands to ALU 910 which executes an arithmetic or logic operation on the operands according to control signals from a controller 900. The arithmetic or logic operation can be one of arithmetic addition, multiplication, bit shifting, and other operations according to the control signals. The controller 900 decodes instructions based on an instruction set and generates the control signal and the operands from the decoded instructions. The ALU 910 outputs result of the arithmetic or logic operation to register 923. Buses and connections for transmitting clock signals, the operands, the output data, and the control signals are shown as arrows in FIG. 9. Data can be provided through an input bus to each of the registers 921 and 922 to update operands. Data in the register 923 can be output to another memory device or component in the processor 151.

The processor 151 may transit from a working state to a sleep state or a low power consumption state in response to a power saving command without storing the whole chipset context of the processor 151 to a storage device, and may restore to the working state from the sleep state or the low power consumption state in response to a wake-up command without restoring the whole chipset context of the processor 151 from a storage device. The whole chipset context of the processor 151 may be retained in the chip of the processor 151, such as in the register memory and the cache memory made up of NVRAM. State transition of the processor 151 can be done in a short time if the state transition is executed by retaining chipset context of the processor 151 in the register of the processor 151, and storing the whole chipset context of the processor 151 to a storage device and restoring of the chipset context are not required during state transition.

The power saving command and the wake-up command may be transmitted through the controller 900. The ALU 910 may respond to the power saving command in a clock cycle i by suspending an operation in a clock cycle i+j and transiting from a working state to a sleep state and, wherein i and j are integer variables, and j may be one or more than one. The ALU 910 may respond to the wake-up command in a clock cycle i+n by transiting from the sleep state to the working state and executing the operation suspended in the clock cycle i+j, wherein n is another integer variable. The ALU 910 provides the operation suspending mechanism and operation resume mechanism, and the kernel 1525 may perform a preparation process before issuing an instance of the power saving command and the transition of the ALU 910 to the sleep state. The preparation process comprises shutting down components of the device 100.

A first communication device and a second communication device may carry a intermittent communication according to a schedule. The intermittent communication may be for communication of control signal or data transmission, or for synchronization. For example the first communication device may transmit the schedule to the second communication device. The processor 151 decodes the schedule and converts the schedule to a power state transition plan. A timer, such as one of the timer 50 and 60 may cause the controller 900 to deliver the power saving command and the wake-up command to the processor 151 according to the power state transition plan. The timer may keep working on delivery of the power saving command and the wake-up command regardless of the state of the ALU 910.

The first communication device and the second communication device may be two embodiments of the device 100 and may exclude some components of the device 100, such as the display, touch panel, media playback related components, and others. The first communication device and the second communication device may communicate in a machine to machine (M2M) mode or in a server to client mode. Each of the first communication device and the second communication device may begin communication to each other in the working states and stop communication in the sleep state. For example, the first communication device may be a base station, and the second communication device may be a mobile station.

In a condition that the device 100 functions as a mobile terminal, the communication unit 156 comprises a decoder operable to decode superposition coding and non-coherent multi-user (MU) multiple input multiple output (MIMO) coding. In a condition that the device 100 functions as a base station or an access point, the communication unit 156 comprises an encoder operable to encode superposition coding and non-coherent multi-user (MU) multiple-input multiple-output (MIMO) coding. The superposition coding is a multiplexing scheme which multiplies signals $x_1$, $x_2, \ldots x_K$ to multi-user terminals from 1 to K by power sharing factors $\gamma_1, \gamma_2, \ldots \gamma_K$, where K is the number of terminals, and summation of the power sharing factors $\gamma_1, \gamma_2, \ldots \gamma_K$ equals to one. The non-coherent MU-MIMO coding may be based on differential unitary space-time modulation (DUSTM) constellations or Grassmannian constellations (GC). Applying superposition coding to non-coherent MIMO coding reduces complexity of MU-MIMO downlink detection as disclosed by IEEE SIGNAL PROCESSING LETTER, VOL 21, No. 10, October 2014, entitled "Multi-User Non-Coherent Detection for Downlink MIMO Communication." The first communication device may determine a power dispatching plan and dispatch the power sharing factors $\gamma_1, \gamma_2, \ldots \gamma_K$ to K terminals including the second communication device according to the power dispatching plan. For example, if a power sharing factor $\gamma_m$ is dispatched to terminal m, the first communication device multiplies the signal $x_m$ transmitted to terminal m by the power sharing factor $\gamma_m$ and a power value P to generate $P \cdot \gamma_m \cdot x_m$ where m is an integer variable and $1 \leq m \leq K$. If a power sharing factor $\gamma_{m+1}$ is dispatched to terminal m+1, the first communication device multiplies the signal $x_{m+1}$ transmitted to terminal m+1 by the power sharing factor $\gamma_{m+1}$ and a power value P to generate $P \cdot \gamma_{m+1} \cdot x_{m+1}$. The K terminals perform successive interference cancellation and downlink non-coherent MIMO signal detection according to the power dispatching plan. If $\gamma_1 > \gamma_2 > \ldots \gamma_m > \gamma_{m+1} > \gamma_{m+2} > \ldots \gamma_K$, the terminal m performs successive interference cancellation prior to the terminal m+1, and terminal m+1 performs successive interference cancellation prior to the terminal m+2 with the power sharing factors $\gamma_{m+2}$. The terminals 1 to K may be embodiments of the device 100.

Let $Y_m = W_m + X_m \cdot H_m$ be the received signal of terminal m, where $W_m = W_{m+1} + X_{m+1} \cdot H_{m+1}$. $W_m$ is the noise in $Y_m$. $H_m$ is a channel matrix for terminal m. $X_m = P \cdot \gamma_m \cdot x_m$. Let $Y_{m+1} = W_{m+1} + X_{m+1} \cdot H_{m+1} + X_m \cdot H_m$ be the received signal of terminal m+1, where $W_{m+1} = W_{m+2} + X_{m+2} \cdot H_{m+2}$. $W_{m+1}$ is the noise in $Y_{m+1}$. $H_{m+1}$ is a channel matrix for terminal m+1. $X_{m+1} = P \cdot \gamma_{m+1} \cdot x_{m+1}$. Let $Y_{m+2} = W_{m+2} + X_{m+2} \cdot H_{m+2} + X_{m+1} \cdot H_{m+1} + X_m \cdot H_m$ be the received signal of terminal m+2, where $W_{m+2} = W_{m+3} + X_{m+3} \cdot H_{m+3}$. $W_{m+2}$ is the noise in $Y_{m+2}$. $H_{m+2}$ is a channel matrix for terminal m+2. $X_{m+2} = P \cdot \gamma_{m+2} \cdot x_{m+2}$.

The terminal m once completing successive interference cancellation to obtain processed signal $X_m \cdot H_m$ can transmit the processed signal $X_m \cdot H_m$ to the terminal m+1, so that the terminal m+1 can obtain signal $W_{m+1} + X_{m+1} \cdot H_{m+1}$ by subtracting the processed signal $X_m \cdot H_m$ from $Y_{m+1}$. Similarly, the terminal m+1 once completing successive interference cancellation to obtain processed signal $X_{m+1} \cdot H_{m+1}$ can transmit the processed signal $X_{m+1} \cdot H_{m+1}$ to the terminal m+2, so that the terminal m+2 can obtain signal $W_{m+2} + X_{m+2} \cdot H_{m+2}$ by subtracting the processed signals $X_m \cdot H_m$ and $X_{m+1} \cdot H_{m+1}$ from $Y_{m+2}$.

4. Conclusion

In conclusion, one of different levels of garbage collection may be performed between reception of a shutdown command and actual power-off of the device 100. Thus, memory utilization may be well managed to endure long-term usage. Procedures in normal bootstrapping, such as clearing of the main memory 152, and migration of OS kernel, are partially performed prior to actual booting of the device 100 to reduce boot time.

NVRAM may be a key enabler to the rise of machine to machine (M2M) communication, and Internet of things (Iot). Integrating NVRAM as register memory in processors may realize an intermittent communication between two devices according to a intermittent communication schedule.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic computing device comprising:
a processor:
a main memory of the processor, the main memory comprising a nonvolatile memory and retaining data and programs stored in the main memory even if the electronic computing device is shut down, wherein the electronic computing device further comprises a backup nonvolatile memory area storing a kernel of an operating system of the electronic computing device, a setting parameter of the electronic computing device is indicative of one of a plurality of memory related values and reflects a first user operation, and the processor executes the reboot method comprising:
retaining an executable instance of the kernel in the main memory during a shutdown process of the electronic computing device in response to an interrupt representing a shutdown command according to the setting parameter of the electronic computing device; and
shutting down the electronic computing device in response to the shutdown command; and
detecting a second user operation for a defined condition of the second user operation;
clearing the main memory and loading the kernel to the main memory to replacing the executable instance of the kernel during a bootstrapping process of the electronic computing device according to the second user operation regardless of whether the executable instance of the kernel is retained in the main memory during the shutdown process.

2. The electronic computing device as claimed in claim 1, wherein the reboot method further comprises:
clearing a located memory area of the main memory during the shutdown process of the electronic computing device in response to the shutdown command if the setting parameter is indicative of a first setting parameter value; and
bypassing the clearing of the located memory area of the main memory during the bootstrapping process of the electronic computing device in response to a boot command upon a specific condition of detecting the second user operation.

3. The electronic computing device as claimed in claim 1, wherein the setting parameter is indicative of one of a plurality of memory releasing processes, and the reboot method further comprises:
performing a portion of the bootstrapping process of the electronic computing device before shutdown of the electronic computing device in response to the shutdown command, wherein the portion of the bootstrapping process comprises:
reloading the kernel to the main memory to retain a updated instance of the kernel in the main memory upon a condition that the setting parameter is indicative of a more aggressive memory releasing;
recording in a bootstrap-related field a resume address of the main memory from which execution of the kernel is designated to resume in response to reboot of the electronic computing device; and
shutting down the electronic computing device in response to the shutdown command.

4. The electronic computing device as claimed in claim 3, further comprising:
disabling interrupt handling during the reloading of the kernel.

5. The electronic computing device as claimed in claim 1, further comprising:
retaining an existing instance of the kernel prior to the shutdown command as the executable instance of the kernel in the main memory through the shutdown process in response to the shutdown command of the electronic computing device;
recording in a bootstrap-related field a resume address of the main memory from which execution of the kernel is designated to resume in response to a reboot of the electronic computing device; and
shutting down the electronic computing device in response to the shutdown command.

6. The electronic computing device as claimed in claim 1, further comprising:
retaining the executable instance of the kernel and at least one application program in the main memory through the shutdown process upon a condition that the setting parameter is indicative of the less aggressive memory releasing.

7. The electronic computing device as claimed in claim 1, further comprising:
establishing a wireless cellular communication channel;
establishing a wireless local area network communication channel; and
providing a service of wide area network access by providing a wireless access point function offering the service based on the wireless cellular communication channel and the wireless local area network communication channel.

8. A reboot method executable by an electronic computing device comprising a first nonvolatile memory operable to store a kernel of an operating system of the electronic computing device, a main memory comprising a second nonvolatile memory of the electronic computing device, and a processor operable to utilize the second nonvolatile memory operable as the main memory of the electronic computing device, a setting parameter of the electronic computing device is indicative of one of a plurality of memory related values, wherein the setting parameter reflects a user operation and is associated with a decision of whether the main memory retains executable programming codes over shutdown of the electronic computing device for resumable execution during a next bootstrapping process of the electronic computing device after the shutdown, and the reboot method comprises:
clearing a portion of the main memory during a state transition process of the electronic computing device in response to an interrupt representing one of a shutdown command and a bootstrapping command if the setting parameter of the electronic computing device is indicative of a first parameter value; and
clearing the entirety of the main memory according to the setting parameter of the electronic computing device indicative of a second parameter value during the state transition process of the electronic computing device in response to the interrupt, wherein the interrupt is issued to change an operating state of the electronic computing device in response to an operation of the input unit;
wherein at least one of the clearing of at least one of the portion of the main memory and the clearing of the entirety of the main memory make more memory space for a next bootstrapping of the electronic computing device.

9. The reboot method as claimed in claim 8, further comprising:
retaining an executable instance of the kernel in the main memory through a shutdown process associated with the shutdown command, wherein the setting parameter reflects whether the executable instance of the kernel is formed from a old version of the kernel lasting in the main memory or a new version of the kernel reloaded to the main memory.

10. The reboot method as claimed in claim 8, wherein the reboot method further comprises:
shutting down the electronic computing device in response to the shutdown command;
clearing the entirety of the main memory according to a configurable bootstrap-related field of the electronic computing device during a bootstrapping process of the electronic computing device in response to a first instance of a boot command of the electronic computing device upon a condition that the bootstrap-related field comprises a first value, wherein the bootstrap-related field reflects a bootstrapping sequence among a plurality of bootstrapping sequences of the electronic computing device associated with the bootstrapping process, and reflects a decision of whether to resume executable programming codes retained in the main memory during the bootstrapping process, wherein the executable programming codes is retained in the main memory over shutdown of the electronic computing device; and
bypassing the clearing of the entirety of the main memory during the bootstrapping process of the electronic computing device in response to the first instance of the boot command according to the bootstrap-related field upon a condition that the bootstrap-related field comprises a second value.

11. The reboot method as claimed in claim 8, wherein the setting parameter is indicative of one of a plurality of memory releasing processes, and the reboot method further comprises:
performing a portion of a bootstrapping process of the electronic computing device before shutdown of the electronic computing device in response to a first instance of the shutdown command, wherein the portion of the bootstrapping process comprises:

reloading the kernel to the main memory upon a condition that the setting parameter is indicative of a more aggressive memory releasing;

recording in a configurable memory-related field a resume address of the second nonvolatile memory from which execution of the kernel is designated to resume in response to reboot of the electronic computing device;

shutting down the electronic computing device in response to the shutdown command; and bypassing clearing of the main memory and bypassing the reloading of the kernel during an instance of the bootstrapping process of the electronic computing device according to the configurable memory-related field.

12. The reboot method as claimed in claim 11, wherein the reboot method further comprises:

disabling interrupt handling during the reloading of the kernel.

13. A reboot method executable by an electronic computing device comprising a first nonvolatile memory, a second nonvolatile memory, and a processor, wherein the first nonvolatile memory is operable to store a kernel of an operating system of the electronic computing device, the processor utilizes the second nonvolatile memory operable as a main memory of the electronic computing device, a setting parameter of the electronic computing device is indicative of one of a plurality of memory related values, the setting parameter reflects a user operation and is associated with a decision of whether the main memory retains executable programming codes over shutdown of the electronic computing device for resumable execution during a next bootstrapping process of the electronic computing device after the shutdown, and the processor executes the reboot method comprising:

clearing the entirety of the main memory during a shutdown process of the electronic computing device in response to an interrupt representing a shutdown command according to the setting parameter of the electronic computing device is indicative of a first parameter value; and shutting down the electronic computing device in response to the shutdown command; and loading the kernel to the main memory and bypassing clearing of the main memory prior to the loading of the kernel during a bootstrapping process of the electronic computing device according to the configurable memory-related field.

14. An electronic computing device comprising:

a processor; and a main memory of the processor, which comprises a nonvolatile memory and retains data and programs stored in the main memory even if the electronic computing device is shut down, wherein the electronic computing device further comprises a backup nonvolatile memory area storing a kernel of an operating system of the electronic computing device, a setting parameter of the electronic computing device is indicative of one of a plurality of memory related values and reflects a first user operation, and the processor executes the reboot method comprising:

clearing the entirety of the main memory during a shutdown process of the electronic computing device in response to an interrupt representing a shutdown command according to the setting parameter of the electronic computing device is indicative of a first parameter value; and shutting down the electronic computing device in response to the shutdown command; and clearing of the main memory and loading the kernel to the main memory during a bootstrapping process of the electronic computing device according to a second user operation regardless of whether the clearing of the main memory is complete during the shutdown process.

15. The electronic computing device as claimed in claim 14, further comprising:

retaining application programs in the main memory through the shutdown process upon a condition that the setting parameter is indicative of the less aggressive memory releasing.

16. The electronic computing device as claimed in claim 14, further comprising:

clearing the entirety of the main memory including the nonvolatile memory in response to the bootstrapping command according to a configurable memory-related field.

17. The electronic computing device as claimed in claim 14, wherein the setting parameter reflects the first user operation and is associated with a decision of whether the main memory retains executable programming codes over shutdown of the electronic computing device for resumable execution during a next bootstrapping process of the electronic computing device after the shutdown.

18. The electronic computing device as claimed in claim 14, further comprising:

establishing a wireless cellular communication channel;

establishing a wireless local area network communication channel; and providing a service of wide area network access by providing a wireless access point function offering the service based on the wireless cellular communication channel and the wireless local area network communication channel.

19. An electronic computing device comprising a main memory of a processor of the electronic computing device, the main memory comprising a nonvolatile memory and retaining data and programs stored in the main memory even if the electronic computing device is shut down, the reboot method comprising:

clearing the entirety of the main memory according to a configurable bootstrap-related field of the electronic computing device during a bootstrapping process of the electronic computing device and loading an operating system kernel to the main memory in response to a first instance of a boot command of the electronic computing device upon a condition that the bootstrap-related field comprises a first value, wherein the bootstrap-related field reflects a bootstrapping sequence among a plurality of bootstrapping sequences of the electronic computing device associated with the bootstrapping process; and resuming execution of an existing instance of the operating system kernel retained in the main memory by bypassing the clearing of the entirety of the main memory during the bootstrapping process of the electronic computing device in response to the first instance of the boot command according to the bootstrap-related field upon a condition that the bootstrap-related field comprises a second value;

wherein the existing instance of the operating system kernel is retained in the main memory through a shutdown state of the electronic computing device before the bootstrapping process.

20. The electronic computing device as claimed in claim 19, wherein the execution of the existing instance of the operating system kernel is resumed according to a resume address during the bootstrapping process to bypass reloading of the operating system kernel, and the resume address indicates an instruction of the existing instance of the operating system kernel and is stored in a nonvolatile memory area before a shutdown process prior to bootstrapping process.

* * * * *